(No Model.)    3 Sheets—Sheet 1.
J. C. RICHARDSON.
MACHINE FOR MAKING HOES.
No. 267,372.    Patented Nov. 14, 1882.
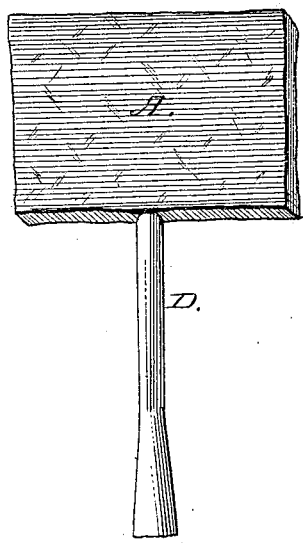
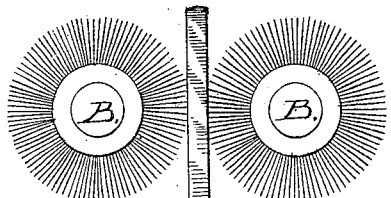
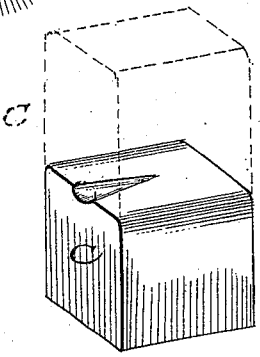
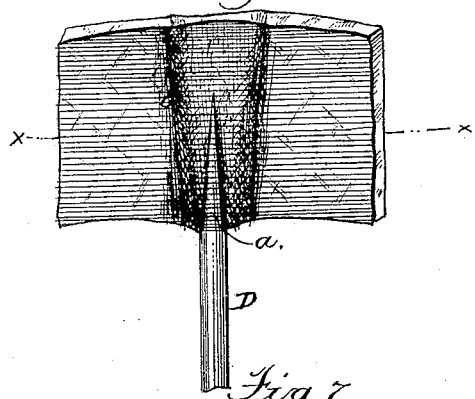
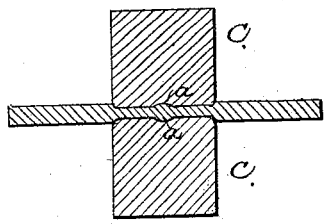
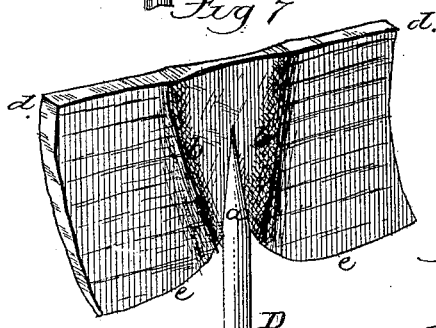
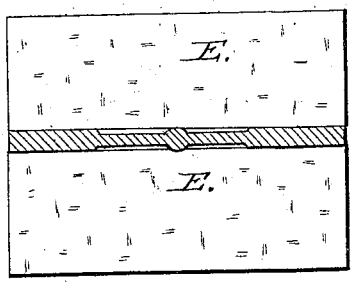
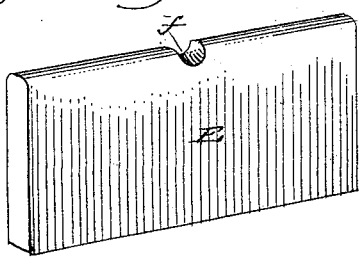
Witnesses:
T. Walter Fowler,
R. K. Evans
Inventor;
Julius C. Richardson
by A. H. Evans & Co
his attys.

(No Model.) 3 Sheets—Sheet 2.
J. C. RICHARDSON.
MACHINE FOR MAKING HOES.
No. 267,372. Patented Nov. 14, 1882.
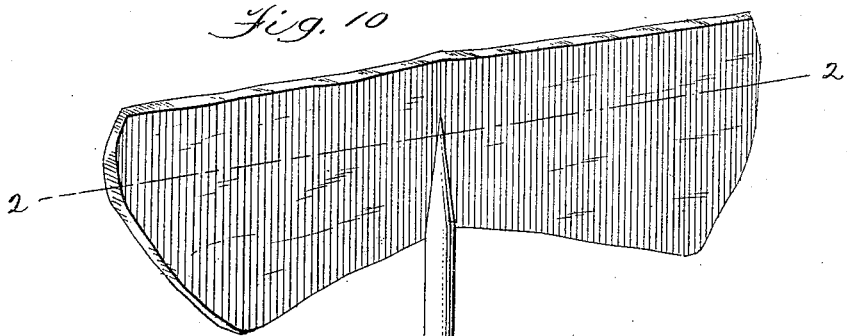
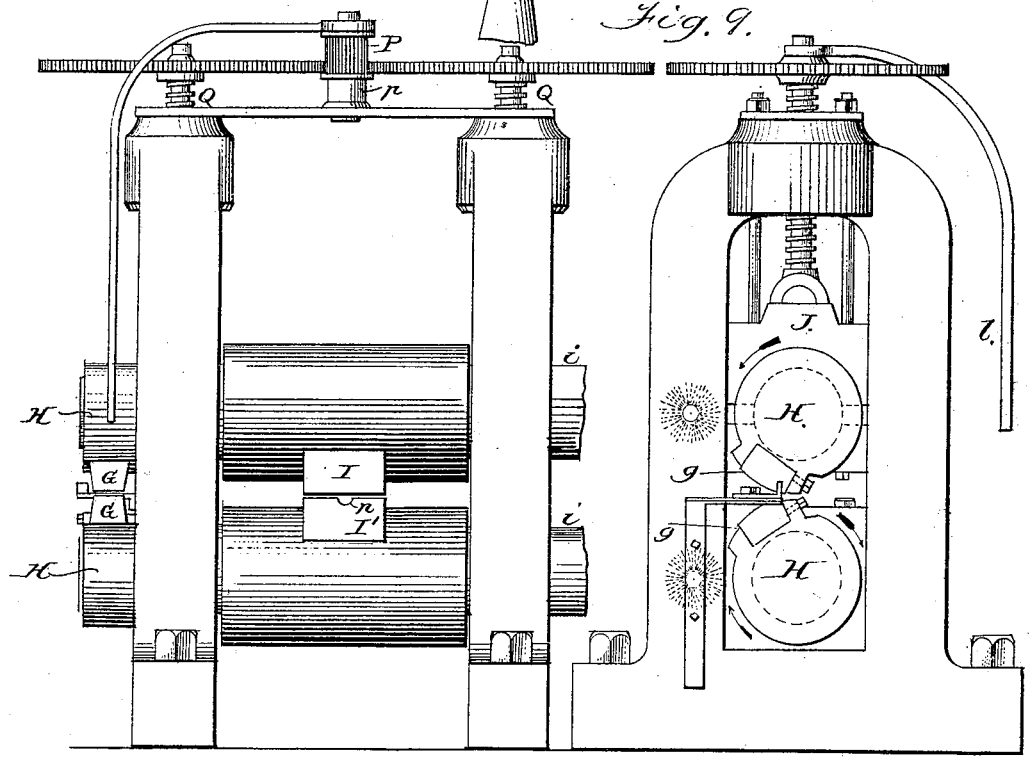
 
Witnesses:
Walter Fowler,
R. K. Evans
Inventor:
Julius C. Richardson
by A. H. Evans & Co.
Attys

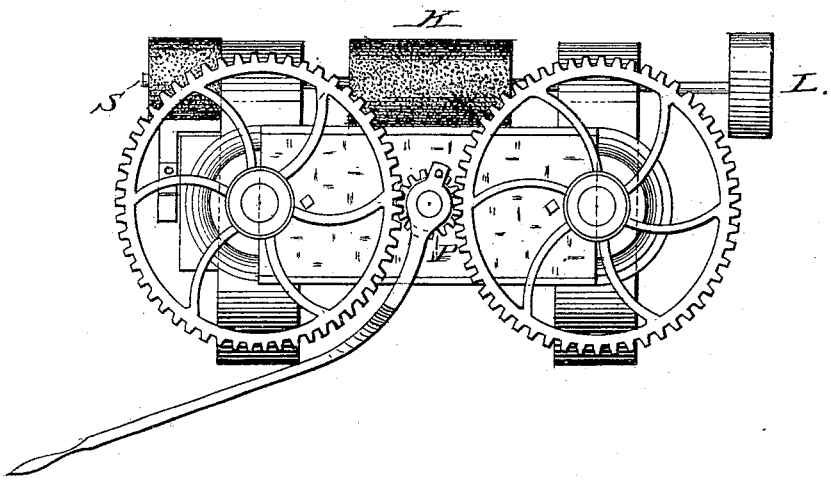
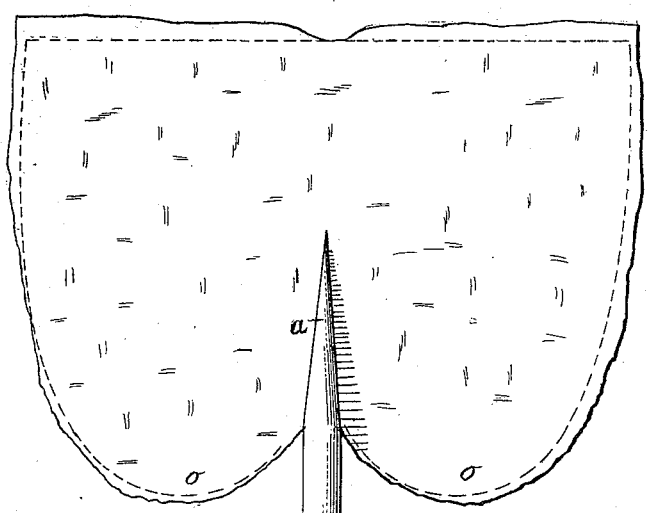

UNITED STATES PATENT OFFICE.

JULIUS C. RICHARDSON, OF COLUMBUS, OHIO.

MACHINE FOR MAKING HOES.

SPECIFICATION forming part of Letters Patent No. 267,372, dated November 14, 1882.

Application filed September 17, 1881. (No model.)

*To all whom it may concern:*

Be it known that I, JULIUS C. RICHARDSON, of Columbus, Ohio, have invented certain new and useful Improvements in Machines for Forging Hoes, of which the following is a clear, full, and exact description, reference being had to the accompanying drawings, making a part of this specification, in which—

Figure 1 shows the blank ready for forging. Fig. 2 illustrates the revolving wire brushes and the blank thrust between them. Figs. 3 and 4 illustrate the die for the first operation and the blank when taken from it. Figs. 5, 6, and 7 illustrate the dies of the second pass and the appearance of the blank after treatment. Figs. 8, 9, and 10 illustrate the dies for the third pass, the machine in which the dies are used, and the appearance of the blank after treatment in the third pass. Fig. 11 is a plan of the machine in which the revolving dies are used. Fig. 12 shows the forging complete and ready for trimming.

My invention appertains to the manufacture of hoes for agricultural purposes, and has for its object the construction of the hoe at one heat in a rapid and economical manner.

My invention consists, first, in subjecting the hoe-blank instantly upon its withdrawal from the heater to the action of rapidly-moving steel-wire brushes; secondly, in a series of dies to which the blank is consecutively subjected, and hereinafter more fully described; thirdly, in a combination of a set of moving wire brushes with the dies for the purpose of cleansing them; fourthly, in the details of construction of an adjusting device for a machine carrying dies, whereby the workman is enabled readily to compensate for wear or expansion by heat; fifthly, in the peculiar construction of the die used in the third pass of the hoe-blank.

In order that those skilled in the art may make and use my invention, I will proceed to describe the manner in which I have carried it out.

In the said drawings, A represents a blank for making a hoe, and B B two rapidly-revolving steel-wire brushes located within an easy reach of the heater, and between which the heated blank is inserted for the purpose of removing all slag and oxide from its surface to keep the metal clean during the subsequent manipulations. The blank A, being properly heated, is held between brushes B B, and then subjected to the action of dies C C in a trip-hammer or press. This spreads the metal from the central portion, B B, toward the edges, and leaves a bead, $a$, on each side of the blank of a prolongation of the shank D. The blank is then put beneath dies E E and struck in a series of blows, commencing near the front edge, which draws out the metal in curved lines on each side of the shank, as seen in Fig. 7, leaving the portion $d$ of the blank thicker than at the curved edges $e\,e$. The dies E E are provided with recesses $f$, so that during their operation the rib $a\,a$ on each side of the blank remains intact. The blank being in the condition shown in Fig. 7, it is subjected to the operation of dies G G, (seen in Fig. 9,) the said dies being secured in the surfaces of the revolving rollers H H, at their ends. The faces of the dies G have near their ends $g$, which come in contact with the blanks last, shallow concavities $h\,h$, for a purpose hereinafter described. The blank is inserted between dies G G, one-half at a time, and so that the dies come first in contact with it on each side of the rib in the depressions $b\,b$ and "draw" the metal from the center toward the edges of the blank. In this operation the slight concavities $h\,h$ leave the metal in the blank of the hoe-blade, on each side of the ribs $a\,a$ slightly thicker along the line 2 2 than elsewhere, as seen in Fig. 9. Between the treatment by each pair of dies the blank is preferably subjected to the action of the steel brushes B B, so that the surface of the metal may be kept perfectly clean of scale, and consequently smooth. The blank (seen in Fig. 10) is then subjected to a pair of finishing-dies, I I', which are inserted in the face of the rolls H H, between the supporting-journals $i\,i$. The die I has a plane face, while the die I' has the depression $n$ to perpetuate the rib $a$ on the front of the completed hoe-blade, as seen in Fig. 12. The successive passes through dies I I' gradually draw out the ears $o\,o$ of the hoe and spread the blade to a form seen in Fig. 12, which requires scarcely if any trimming. The completed hoe-blade is trimmed by well-known means in the proper shape indicated in proper lines.

Properly journaled to the standards sustaining rollers H H, and in rear of dies G G and I I', is a movable shaft, S, on which are fixed revolving wire brushes K K, driven by a pulley, L. At each revolution of the rollers H H the faces of the dies G G and I I' pass in contact with these revolving wire brushes, and all scale and oxide is removed from the face of the dies, thereby insuring a smooth surface to the work. The shaft S being removable, when it is necessary to grind the dies to true them up I simply take out shaft S and substitute for it a shaft provided with an emery-wheel of a proper size and turning the rollers until the faces of the dies come in contact with the said emery-wheel, whereby I am enabled to grind the dies without removing them from the rolls H H.

In this class of machines it has heretofore been troublesome to adjust the rolls quickly and readily in order to compensate for wear or the expansion of heat. I accomplish this adjustment quickly and truly by means of a pinion, P, mounted on a stud, p, in the center of the top of the frame, and provide said pinion with a lever, l, which descends in front and within reach of the operator. The screws Q, which sustain the movable journal-boxes J of the rollers, have their heads provided with gear-wheels of large diameter and meshing into pinion P. The movement of the lever and pinion moves screws Q simultaneously and evenly, so that the tension of the work can be increased or diminished instantly.

Having thus described my invention, what I claim as new, and desire to secure by Letters Patent, is—

1. The rollers H, carrying the revolving dies G G I I', and the combination with the same of revolving brushes for cleaning said dies, as set forth.

2. The revolving brushes, in combination with the rollers H and dies I I', and a removable shaft on which said brushes are mounted, substantially as set forth.

JULIUS C. RICHARDSON.

Witnesses:
IRA H. CRUM,
LORENZO D. HAGERTY.